United States Patent [19]
Miyawaki

[11] Patent Number: 5,793,452
[45] Date of Patent: Aug. 11, 1998

[54] DISPLAY DEVICE WITH JIG AND COOLING MEANS

[75] Inventor: Mamoru Miyawaki, Isehara, Japan

[73] Assignee: Canon Kabushiki Kaisha, Tokyo, Japan

[21] Appl. No.: 915,663

[22] Filed: Aug. 21, 1997

Related U.S. Application Data

[63] Continuation of Ser. No. 712,088, Sep. 11, 1996, abandoned.

[30] Foreign Application Priority Data

Sep. 13, 1995 [JP] Japan ................................ 7-259583
Sep. 6, 1996 [JP] Japan ................................ 8-235700

[51] Int. Cl.$^6$ ............... G02F 1/1333; G02F 1/133; G02F 1/1345
[52] U.S. Cl. .................. 349/58; 349/72; 349/151; 349/161
[58] Field of Search .................. 349/58, 72, 151, 349/161

[56] References Cited

U.S. PATENT DOCUMENTS

| | | | |
|---|---|---|---|
| 3,910,029 | 10/1975 | Yamazaki | 349/58 |
| 4,575,190 | 3/1986 | Wood et al. | 349/58 |
| 4,796,977 | 1/1989 | Drake | 349/58 |
| 5,032,021 | 7/1991 | Kanatani et al. | 349/5 |
| 5,583,681 | 12/1996 | Shioya et al. | 349/161 |
| 5,721,602 | 2/1998 | Narayan et al. | 349/161 |

FOREIGN PATENT DOCUMENTS

87/07394  12/1987  WIPO ........................ 349/161

*Primary Examiner*—Anita Pellman Gross
*Attorney, Agent, or Firm*—Fitzpatrick, Cella, Harper & Scinto

[57] ABSTRACT

In a display device using a liquid-crystal panel, pixel electrodes for reflecting illuminating light, transistors for switching corresponding pixels, and a peripheral driving circuit are integrated on a Si semiconductor substrate. The angle of the surface of connecting portions of a jig for fixing and supporting the Si semiconductor substrate is made to be different from the angle of the surfaces of the pixel electrodes. A cooling device is mounted on the back of the Si semiconductor substrate.

22 Claims, 4 Drawing Sheets

DISPLAY DEVICE WITH JIG AND COOLING MEANS

This application is a continuation of application Ser. No. 08/712,088, filed Sep. 11, 1996, now abandoned.

BACKGROUND OF THE INVENTION

1. Field of the Invention

This invention relates to a display device for displaying images, characters and the like.

2. Description of the Related Art

As a result of the advent of the multimedia era, display devices, serving as information exchange means which appeal to human sensibility, are attracting attention. Among various kinds of display devices, liquid-crystal display devices, which are portable and have an energy-saving property, are developing a leading industry next to the semiconductor industry.

Although liquid-crystal display devices have already been widely used as display devices for notebook-size personal computers, an attempt to use a liquid-crystal display device as a light bulb for a projector in order to realize a large-size display picture surface has been intensively pursued.

In a light bulb for a projector, in order to provide a higher-definition picture surface, polycrystalline Si TFT's (thin-film transistors), in which peripheral circuits can be incorporated within a panel and a transistor for driving each pixel can have a high driving force with a small size, are provided on a quartz substrate.

In order to display a high-luminance image on a large picture surface, a strong light beam must be projected onto a small light bulb. In an ordinary liquid-crystal panel, polarizers are provided on both surfaces of the panel. However, only about 35% of the amount of light can pass through these polarizers, and the numerical aperture is 30–50 % within the liquid-crystal panel. In addition, if color filters are provided, optical loss due to the filters is present. As a whole, a large amount of light cannot pass through the panel, thereby producing heat.

As the temperature of the liquid-crystal panel increases, the characteristics of the liquid crystal are degraded, and leak current in the polycrystalline Si TFT's, serving as pixel switches, increases, thereby causing degradation of the picture-quality due to malfunction.

There is also such a problem that light reflected from a jig for fixing the liquid-crystal panel is mixed with the displayed image, thereby degrading the display characteristics.

SUMMARY OF THE INVENTION

It is an object of the present invention to solve the above-described problems.

It is another object of the present invention to provide a high-luminance, high-definition, high-contrast, low-cost and compact display device, and more specifically, to prevent degradation of the picture quality due to heating by simple means and to realize high-quality image display. The invention is not limited to a liquid-crystal display.

According to the present invention, in a display device having a semiconductor substrate including TFT's, each serving as a pixel switch, by providing a cooling device at the back of the semiconductor substrate, constituting a reflection-type liquid-crystal panel using a light-reflecting member, and setting the angle of the surface of a jig for fixing and supporting the semiconductor substrate to be different from the angle of the surface of the light-reflecting member, heat produced by light lost within the liquid-crystal panel is dispersed outside the panel, thereby preventing the influence on the inside of the liquid-crystal panel, and preventing light reflected by the jig from being mixed with light reflected by the light-reflecting member, so that only desired reflected light is guided to an illuminating region.

According to one aspect, the present invention which achieves these objectives relates to a display device for performing display by controlling light reflected from a surface for each pixel, comprising a semiconductor substrate having members for reflecting illuminating light, transistors, each for controlling the corresponding one of the reflecting members, and a peripheral driving circuit integraded thereon, a jig for fixing and-supporting the semiconductor substrates and a cooling device situated at the back of the semiconductor substrate. The angle of the surface of the jig at the periphery of the semiconductor substrate is different from the angle of the surfaces of the reflecting members.

In the present invention, by providing a diode for measuring temperature on the semiconductor substrate, the temperature control of the display device can be more smoothly performed.

The present invention can be applied not only to the above-described liquid-crystal display device but also to a DMD (digital micro-mirror device) and the like. When applying the invention to the liquid-crystal display device, a reflection-type liquid-crystal display device may be provided by using pixel electrodes as the reflecting members.

A material having a high thermal conductivity may be provided at the back of the jig at the periphery of the semiconductor substrate.

According to another aspect, the present invention which achieves these objectives relates to a display device for performing display by controlling light reflected from a surface for each pixel, comprising a semiconductor substrate having members for reflecting illuminating light, transistors, each -for controlling the corresponding one of the reflecting members, and a peripheral driving circuit integraded thereon a jig for fixing and supporting the semiconductor substrate, and a cooling device situated at the back of the semiconductor substrate. The surface of the jig is painted black.

A pn diode for measuring temperature may be provided on the semiconductor substrate.

The device may comprise a reflection-type liquid-crystal display device in which the members for reflecting the illuminating light comprise pixel electrodes.

The device may also comprise a digital micro-mirror device in which the members for reflecting the illuminating light comprise reflecting mirrors.

According to still another aspect, the present invention which achieves these objectives relates to a display device for performing display by controlling light reflected from a surface for each pixel, comprising a semiconductor substrate having members for reflecting illuminating light, transistors, each for controlling the corresponding one of the reflecting members, and a peripheral driving circuit integraded thereon, a jig for fixing and supporting the semiconductor substrate, and a cooling device situated at the back of the semiconductor substrate. The surface of the jig at the periphery of the semiconductor substrate has projections and recesses.

A pn diode for measuring temperature may be provided on the semiconductor substrate.

The device may comprise a reflection-type liquid-crystal display device in which the members for reflecting the illuminating light comprise pixel electrodes.

The device may also comprise a digital micro-mirror device in which the members for reflecting the illuminating light comprise reflecting mirrors.

According to the present invention, since the influence of temperature can be prevented, stronger illuminating light can be used. In addition, since reflected light is removed from other regions than the display region, high-luminance and high-contrast display can be realized. Furthermore, since even the peripheral circuit is integrated on the monocrystalline semiconductor substrate, a low-cost and compact display device can be provided.

DETAILED DESCRIPTION OF THE PREFERRED EMBODIMENTS

First Embodiment

A first embodiment of the present invention will now be described, with reference to the cross-sectional view shown in FIG. 1.

Figure 1:
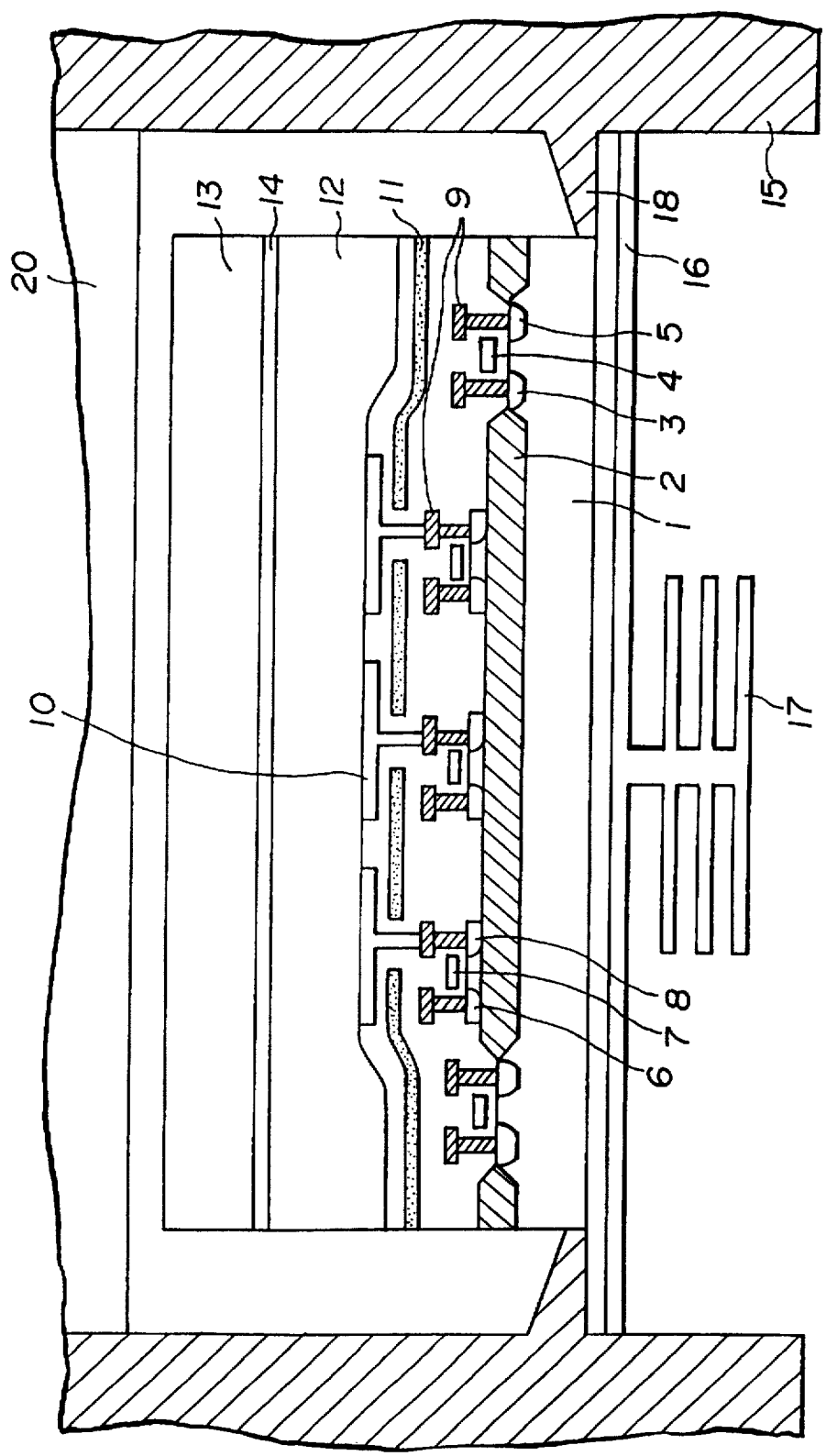
FIG. 1 is a cross-sectional view illustrating a first embodiment of the present invention;.

In FIG. 1, reference numeral 1 represents a Si semiconductor substrate which is a p-type substrate in the present embodiment. Reference numeral 2 represents a field oxide film. Reference numerals 3, 4 and 5 represent the source, the gate and the drain, respectively, of a transistor constituting a peripheral driving circuit for a liquid-crystal panel. Reference numerals 6, 7 and 8 represent the source, the gate and the drain of a pixel-switching TFT provided in a display portion of the liquid-crystal panel. The source 6 and the gate 7 are connected to a signal line and to a driving line, respectively. Reference numeral 9 represents an interconnection layer. The drain of the pixel-switching TFT is connected to a pixel electrode 10 via this interconnection layer 9. A light-blocking layer 11 made of a conductive material provides a capacity for holding a pixel signal with the pixel electrode 10. Reference numeral 12 represents a liquid-crystal layer. A guest-host-type liquid crystal for controlling polarization of light, a ferroelectric liquid crystal (FLC), a polymer-dispersion-type liquid crystal which represents gradation by scattering/nonscattering, or the like is preferably used for the liquid-crystal layer 12. There are also shown a facing glass substrate 13, and a transparent common electrode 14 which is maintained at a common potential.

Reference numeral 15 represents a jig for fixing and supporting the liquid-crystal panel and an optical component 20. The jig 15 is preferably made of a metal plate having an excellent thermal conductivity, and is bonded to the Si semiconductor substrate 1 using silver paste or the like. Reference numeral 16 represents a heat pipe connected to the jig 15. The heat pipe 16 is mounted on a connecting portion 18 of the jig 15 relative to the Si semiconductor substrate I in the form of a pipe, opr on the entire back of the Si semiconductor substrate 1 in the form of a plate-like receptacle.

A structure comprising capillary tubes, which is called a wig, is provided at the inner-wall surface of the heat pipe 16, and an appropriate amount of a hydraulic fluid is sealed in the capillary tubes. When the temperature of the back of the liquid-crystal panel rises, the hydraulic fluid evaporates by absorbing the heat and reaches a radiation fin 17, where the vapor condenses and liquefies while radiating heat to return to the original hydraulic fluid. The hydraulic fluid again returns to the heating end due to capillarity to form circulation.

Any other device than the above-described heat-pipe-type cooling device, such as a cooling device using a liquid, an air-cooling device, a device using the Peltier effect, or the like, may also be used.

The angle of the surface of the connection portion 18 of the jig 15 is set to be different from the angle of the surface of the pixel electrode 10. Accordingly, light projected onto a peripheral portion of the liquid-crystal panel is reflected at an angle different from the angle of reflected light from the pixel electrode 10. Hence, the light reflected from the peripheral portion does not disturbe display at all, and therefore a decrease in contrast due to mixture of reflected light from the periphery of the panel, which is observed in a conventional reflection-type liquid-crystal panel, is prevented.

In addition, since the cooling device is provided and the panel uses a Si substrate having a high thermal conductivity, an increase in the temperature of the liquid-crystal panel is reduced, so that degradation in display characteristics due to temperature rise is prevented, and therefore stronger illuminating light can be utilized.

Furthermore, since the peripheral-driving circuit is integrated on a monocrystalline Si substrate, a high-speed driving circuit having a small pitch and a small area can be realized, and therefore a high-definition and low-cost liquid-crystal panel is provided.

Second Embodiment

A second embodiment of the present invention will now be described with reference to the cross-sectional view shown in FIG. 2.

Figure 2:
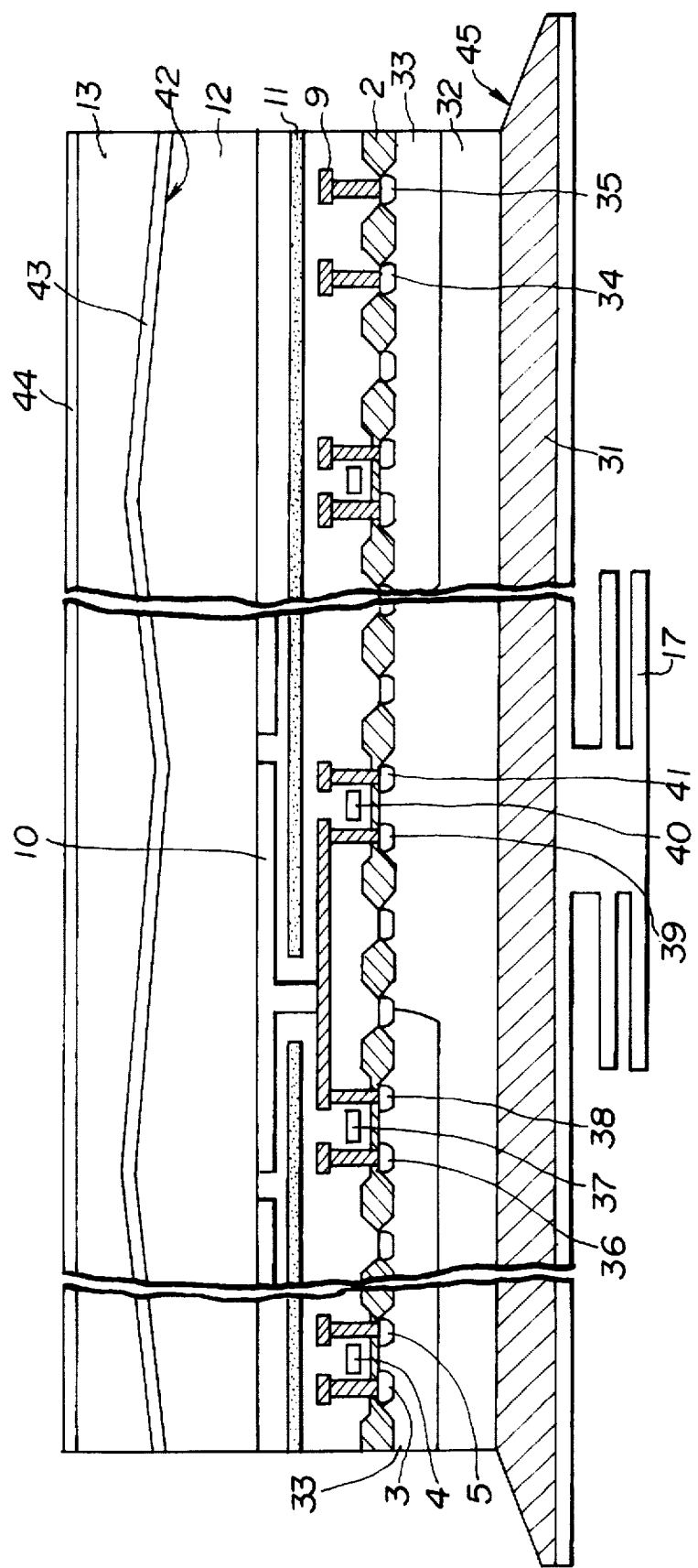
FIG. 2 is a cross-sectional view illustrating a second embodiment of the present invention.

In FIG. 2, the same portions as those in FIG. 1 are indicated by the same reference numerals, and a description thereof will be omitted.

In FIG. 2, reference numeral 31 represents a jig for fixing a semiconductor substrate 32. As indicated by reference numeral 45, the surface of the jig 31 is tapered so as to provide an angle different from the angle of the surface of the pixel electrode. 10 at the periphery of the semiconductor substrate 32. It is desirable to provide a coating material for reducing light reflectivity on the tapered surface.

There are also shown the n-type Si semiconductor substrate 32, a p-type well layer 33, an n$^+$-type diffused layer 34, and a p$^+$-type diffused layer 35. The temperature of the panel is monitored by this pn diode, so that the cooling device 17 provided at the base of the panel can be controlled. Reference numerals 36, 37 and 38 represent the source, the gate and the drain of an n-type MOS FET (metal-oxide semiconductor-type field-effect transistor) provided in the display region. Reference numerals 39, 40 and 41 represent the drain, the gate and the source of a p-type MOS FET also provided in the display region. The two MOS FET's constitute a transmission-type pixel switch. It is thereby possible to write a pixel signal in a pixel electrode irrespective of the threshold of the MOS FET, and therefore to reduce the voltage of the liquid-crystal panel.

In the present embodiment, as indicated by reference numeral 42, the surface of the facing glass substrate 13 is tapered, and a common electrode 43 is provided thereon. An antireflection coating material 44 is provided on the surface of the facing glass substrate 13 opposite to the liquid-crystal layer 12.

By thus providing an angle different from the angle of the pixel electrode 10 at regions where reflected light is produced, providing the cooling device at the back of the Si semiconductor substrate 32 having a high thermal conductivity, and controlling the cooling device by monitoring temperature rise by providing a diode on the Si semiconductor substrate 32, a display having excellent contrast is realized under any environment.

Third Embodiment

Next, a third embodiment of -the present invention will be described with reference to the cross-sectional view shown in FIG. 3. In the present embodiment, the invention is applied not to a liquid-crystal display device, but to a device which deflects a mirror, such as a DMD or the like.

Figure 3:
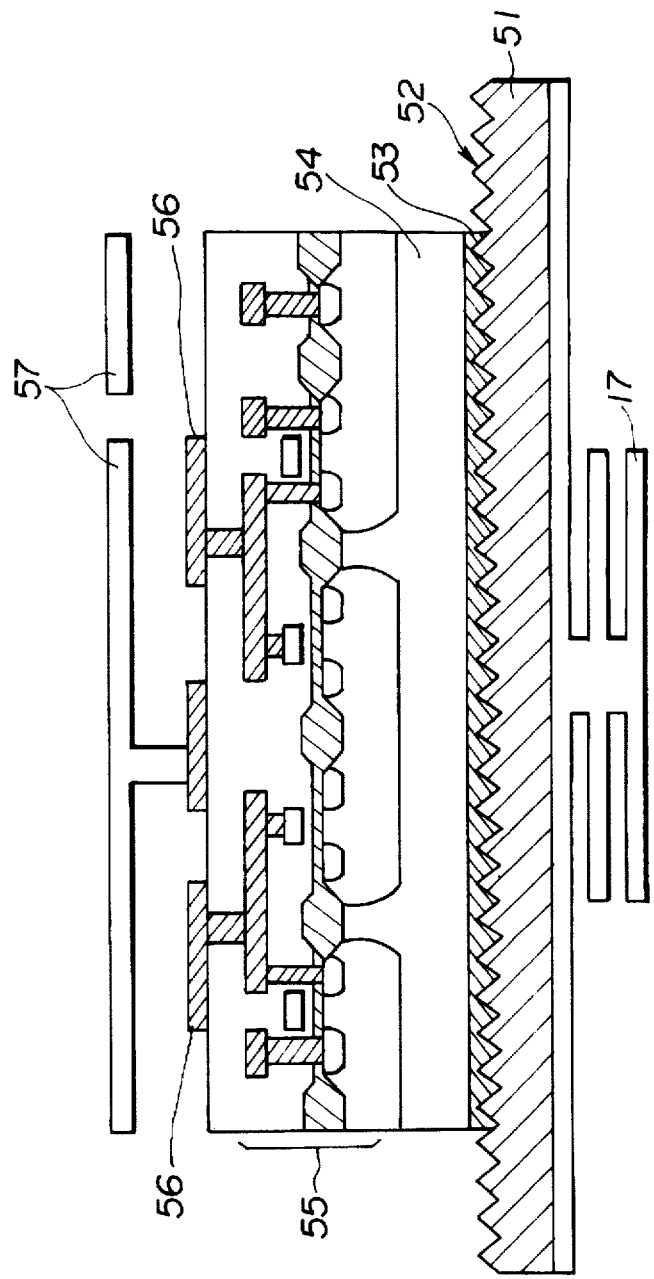
FIG. 3 is a cross-sectional view illustrating a third embodiment of the present invention.

In FIG. 3, reference numeral 51 represents a jig, having projections and recesses 52 provided on the surface thereof where a panel is mounted, made of a material having an excellent thermal conductivity. There are also shown an adhesive 53 between the panel and the jig 51, a Si semiconductor substrate 54, CMOS (complementary MOS) cells 55, each serving as a basic circuit for deflecting a reflecting mirror 57, electrodes 56 for providing potential and the reflecting mirrors 57.

Illuminating light from above in FIG. 3 is returned by being reflected by the reflecting mirrors 57. On the other hand, light projected onto the periphery of the panel is scattered by the projections and recesses 52, and the light reflected therefrom travels at angles different from the angle of the reflected light from the reflecting mirrors 57. Accordingly, it is possible to separate other light than the light from the reflecting mirrors 57 and therefore to realize high contrast. The panel is subjected to temperature control by the cooling device 17 via the jig 51, and therefore a stable operation is realized.

Fourth Embodiment

Figure 4:
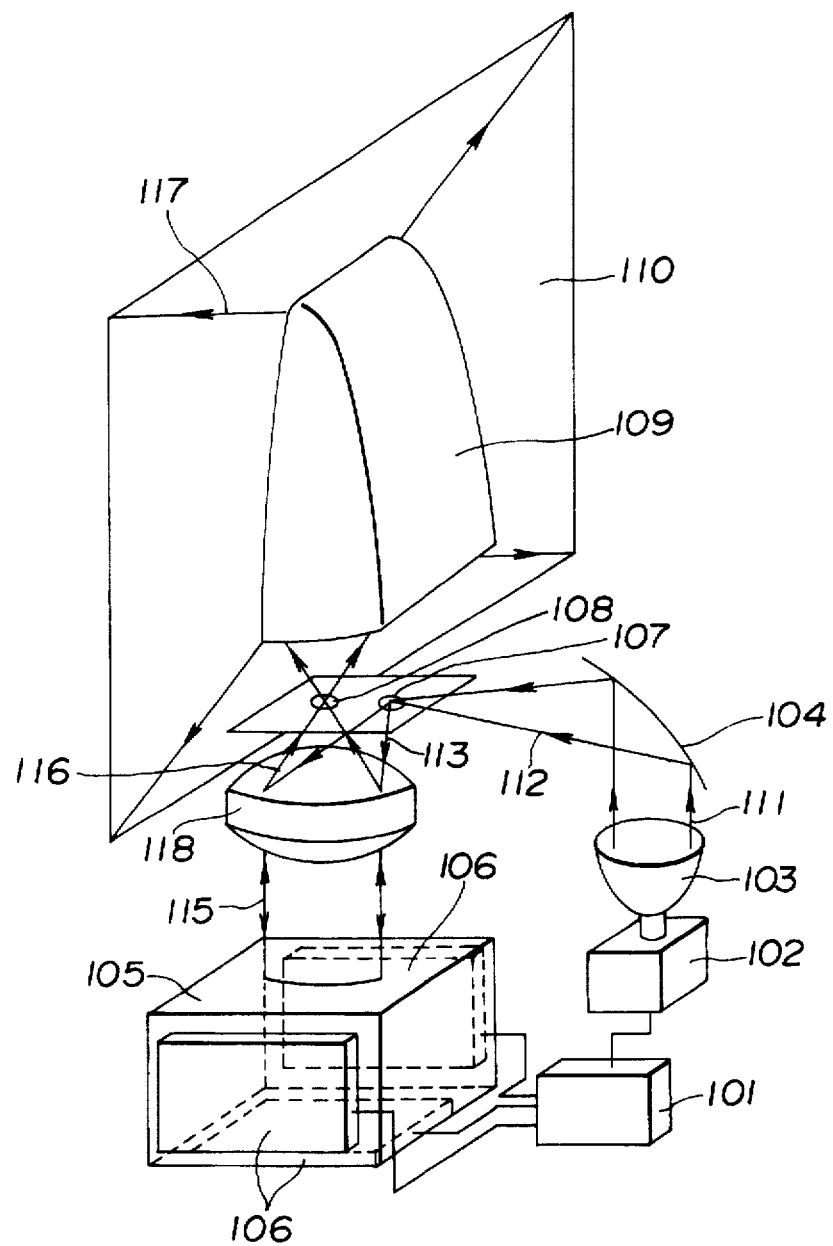
FIG. 4 is a schematic diagram illustrating a fourth embodiment of the present invention in which the display device of the present invention is used as a rear-type projector.

FIG. 4 is a schematic diagram illustrating the configuration of a rear-type projector using a display device of the invention. The device of any one of the first through third embodiments may be suitably used as the display device for the fourth embodiment.

In FIG. 4, reference numeral 101, represents a board for controlling the display device and a light source 103. There are also shown a power supply unit 102 for the light source 103, the light source 103, an aspherical mirror 104, a prism 105 for color separation, the display device 106 of the present invention, a micromirror 107, an aperture 108, a free-form-surface-prism optical system 109, a screen 110, a lens 118, and light beams 111, 112, 113, 115, 116 and 117.

The light beam 111 emitted from the light source 103 is condensed by the aspherical mirror 104 and is imaged onto the micromirror 107. The reflected light beam from the micromirror 107 is separated by the color separation prism 105 into R (red), G (green) and B (blue) light beams, which are projected onto the display device 106 in the form of parallel light beams. That is, the lens 118 is disposed so as to provide a telecentric system.

When the reflected light 115 modulated in accordance with a display signal is again incident upon the lens 118, only display light passes through the aperture 108 and is incident upon the free-form-surface-prism optical system 109. By using this free-for m-surface-prism optical system 109, a thin image having little abberation can be focused onto the screen 110.

The rear-type projector using the display device-of the present invention- can always display a very clear image having high contrast and high luminosity.

Fifth Embodiment

In a fifth embodiment of the present invention, light is absorbed by painting the inside of the connection portion 18, and the jig 15 black. In this embodiment, the angle of the surface of the connection portion 18 is not necessarily different from the angle of the reflecting members. According to the configuration of the fifth embodiment, light projected onto the connection portion 18 and the jig 15, is absorbed by the connection portion 18 and the jig 15, and therefore does not produce irregular reflection. Hence, the display device of the fifth embodiment has large contrast.

Sixth Embodiment

In a sixth embodiment of the present invention, members made of a material having a high thermal conductivity, such as Al, Cu or the like, are provided at the back of the connection portion 18 and the side walls of the jig 15 of the display device shown in FIG. 1. According to the configuration of the sixth embodiment, heat stored in the liquid-crystal panel and the jig 18 can be efficiently radiated. Hence, the display device of the sixth embodiment is very reliable with no malfunction.

The individual components shown in outline in the drawings are all well known in the display device art and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A display device for performing display by controlling light reflected from a surface of each pixel, said device comprising:

a semiconductor substrate having members for reflecting illuminating light, transistors, each for controlling a corresponding one of said reflecting members, and a peripheral driving circuit integrated thereon;

a jig for fixing and supporting said semiconductor substrate; and a cooling device situated behind said semiconductor substrate, wherein the angle of a surface of said jig at the periphery of said semiconductor substrate is different from the angle of surfaces of said reflecting members.

2. A display device-according to claim 1, wherein a pn diode for measuring temperature is provided on said semiconductor substrate.

3. A display device according to claim 1, wherein said reflecting members comprise pixel electrodes.

4. A display device according to claim 1, wherein said reflecting members comprise reflecting mirrors.

5. A display device according to claim 1, wherein a material having a high thermal conductivity is provided at said back of said jig at the periphery of said semiconductor substrate.

6. A display device for performing display by controlling light reflected from a surface of each pixel, said device comprising:

a semiconductor substrate having members for reflecting illuminating light, transistors, each for controlling a corresponding one of said reflecting members, and a peripheral driving circuit integrated thereon;

a jig for fixing and supporting said semiconductor substrate; and a cooling device situated behind said semiconductor substrate, wherein a surface of said jig is painted black.

7. A display device according to claim 6, wherein a pn diode for measuring temperature is provided on said semiconductor substrate.

8. A display device according to claim 6, wherein said reflecting members comprise pixel electrodes.

9. A display device according to claim 6, wherein said reflecting members comprise reflecting mirrors.

10. A display device for performing display by controlling light reflected from a surface of each pixel, said device comprising:

a semiconductor substrate having members for reflecting illuminating light, transistors, each for controlling a corresponding one of said reflecting members, and a peripheral driving circuit integrated thereon;

a jig for fixing and supporting said semiconductor substrate; and a cooling device situated behind said semiconductor substrate, wherein a surface of said jig at the periphery of said semiconductor substrate has projections and recesses.

11. A display device according to claim 10, wherein a pn diode for measuring temperature is provided on said semiconductor substrate.

12. A display device according to claim 10, wherein said reflecting members comprise pixel electrodes.

13. A display device according to claim 10, wherein said reflecting members comprise reflecting mirrors.

14. A display device for performing display by controlling light reflected from a surface of each pixel, said device comprising:

a semiconductor substrate having members for reflecting illuminating light, transistors, each for controlling a corresponding one of said reflecting members, and a peripheral driving circuit integrated thereon; and a jig for fixing and supporting said semiconductor substrate, wherein the angle of surface of said jig at the periphery of said semiconductor substrate is different from the angle of surfaces of said reflecting members.

15. A display device according to claim 14, wherein said reflecting members comprise pixel electrodes.

16. A display device according to claim 14, wherein said reflecting members comprise reflecting mirrors.

17. A display device for performing display by controlling light reflected from a surface of each pixel, said device comprising:

a semiconductor substrate having members for reflecting illuminating light, transistors, each for controlling a corresponding one of said reflecting members, and a peripheral driving circuit integrated thereon; and a jig for fixing and supporting said semiconductor substrate, wherein a surface of said jig is painted black.

18. A display device according to claim 17, wherein said reflecting members comprise pixel electrodes.

19. A display device according to claim 17, wherein said reflecting members comprise reflecting mirrors.

20. A display device for performing display by controlling light reflected from a surface of each pixel, said device comprising:

a semiconductor substrate having members for reflecting illuminating light, transistors, each for controlling a corresponding one of said reflecting members, and a peripheral driving circuit integrated thereon; and a jig for fixing and supporting said semiconductor substrate, wherein a surface of said jig at the periphery of said semiconductor substrate has projections and recesses.

21. A display device according to claim 20, wherein said reflecting members comprise pixel electrodes.

22. A display device according to claim 20, wherein said reflecting members comprise reflecting mirrors.

* * * * *

UNITED STATES PATENT AND TRADEMARK OFFICE
CERTIFICATE OF CORRECTION

PATENT NO. : 5,793,452

DATED : August 11, 1998

INVENTOR(S) : Miyawaki

It is certified that error appears in the above-identified patent and that said Letters Patent is hereby corrected as shown below:

COLUMN 3:

Line 31, "described," should read --described--.
Line 65, "substrate I" should read --substrate 1--, and "opr" should read --or--.

COLUMN 4:

Line 50, "electrode. 10" should read --electrode 10--.

COLUMN 5:

Line 8, "at,regions" should read --at regions--.

COLUMN 6:

Line 3, "free-for m-surface-prism" should read --free-form-surface-prism--.

Signed and Sealed this

Eighth Day of June, 1999

*Attest:*

Q. TODD DICKINSON

*Attesting Officer*     *Acting Commissioner of Patents and Trademarks*